(12) United States Patent
Maestro Garcia et al.

(10) Patent No.: US 10,645,253 B2
(45) Date of Patent: May 5, 2020

(54) GENERATION OF HALFTONE PARAMETERS

(71) Applicant: Hewlett-Packard Development Company, L.P., Houston, TX (US)

(72) Inventors: Javier Maestro Garcia, Sant Cugat del Valles (ES); Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/302,616

(22) PCT Filed: Sep. 30, 2016

(86) PCT No.: PCT/US2016/054849
§ 371 (c)(1),
(2) Date: Nov. 16, 2018

(87) PCT Pub. No.: WO2018/063349
PCT Pub. Date: Apr. 5, 2018

(65) Prior Publication Data
US 2019/0297225 A1    Sep. 26, 2019

(51) Int. Cl.
*H04N 1/60* (2006.01)
*H04N 1/52* (2006.01)
*H04N 1/64* (2006.01)

(52) U.S. Cl.
CPC ............. *H04N 1/52* (2013.01); *H04N 1/6016* (2013.01); *H04N 1/644* (2013.01)

(58) Field of Classification Search
None
See application file for complete search history.

(56) References Cited

U.S. PATENT DOCUMENTS 6,115,031 A * 9/2000 Love .................... H04N 1/6016
345/603
6,705,703 B2    3/2004 Zeng et al.
(Continued)

FOREIGN PATENT DOCUMENTS

EP    1507404 A1    2/2006
EP    1787811 A2    5/2007
(Continued)

OTHER PUBLICATIONS

Kuo Yan-Fu et al., Model-Based Calibration Approach to Improve Tone Consistency for Color Electrophotography. Journal of Imaging Science and Technology., 2011.
(Continued)

*Primary Examiner* — Dung D Tran
(74) *Attorney, Agent, or Firm* — HP Inc. Patent Department

(57) ABSTRACT

A method of generating a set of halftone parameters. The method comprises assigning a first set of halftone parameters to a first location in a color space, the first location in the color space corresponding to a first color, and assigning a second set of halftone parameters to a second location in the color space, the second location in the color space corresponding to a second color. An interpolating between the first set of halftone parameters and the second set of halftone parameters is performed, based on the first location and the second location, to determine a third set of halftone parameters corresponding to a third location in the color space. The result of the interpolation is output data associating the third set of halftone parameters with a third color corresponding to the third location in the color space. The first set of halftone parameters may represent a relative area coverage of a first colorant combination and the second set
(Continued)

of halftone parameters may represent a relative area coverage of a second colorant combination.

18 Claims, 9 Drawing Sheets

(56) References Cited

U.S. PATENT DOCUMENTS

| | | | |
|---|---|---|---|
| 7,304,770 B2 | 12/2007 | Wang et al. | |
| 7,573,607 B2 | 8/2009 | Huan et al. | |
| 7,626,723 B2 | 12/2009 | Yamada et al. | |
| 7,710,597 B2 | 5/2010 | Edge | |
| 8,125,687 B2* | 2/2012 | Tin | H04N 1/6033 |
| | | | 347/19 |
| 9,584,700 B2* | 2/2017 | Morovic | |
| 9,756,221 B2* | 9/2017 | Morovic | H04N 1/6025 |
| 10,291,822 B2* | 5/2019 | Morovic | H04N 1/6055 |
| 2013/0114965 A1* | 5/2013 | Kuo | H04N 1/40006 |
| | | | 399/49 |
| 2016/0080612 A1 | 3/2016 | Vazquez et al. | |
| 2017/0013165 A1* | 1/2017 | Katsuyama | B41J 2/2054 |
| 2017/0064145 A1* | 3/2017 | Morovic | H04N 1/6055 |

FOREIGN PATENT DOCUMENTS

| | | |
|---|---|---|
| JP | 2009153063 A | 7/2009 |
| WO | WO-2015161898 A1 | 10/2015 |
| WO | WO-2016066202 A1 | 5/2016 |

OTHER PUBLICATIONS

Srivastave, S et al, Generating Optimal Look-up Tables to Achieve Complex Color Space Transformations, Nov. 7-10, 2009, < http://ieeexplore.ieee.org/document/5413721/.

* cited by examiner

GENERATION OF HALFTONE PARAMETERS

BACKGROUND

A printing system may be associated with a color space (hereinafter termed a "colorant color space"), defined by one or more colorants available to the printing system for deposition or application to a print medium. An example of a colorant color space is the Cyan, Magenta, Yellow, BlacK (CMYK) color space, wherein four variables are used in a subtractive color model to represent respective quantities of colorants. Examples of colorants include inks, dyes, pigments, paints, toners and powders.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
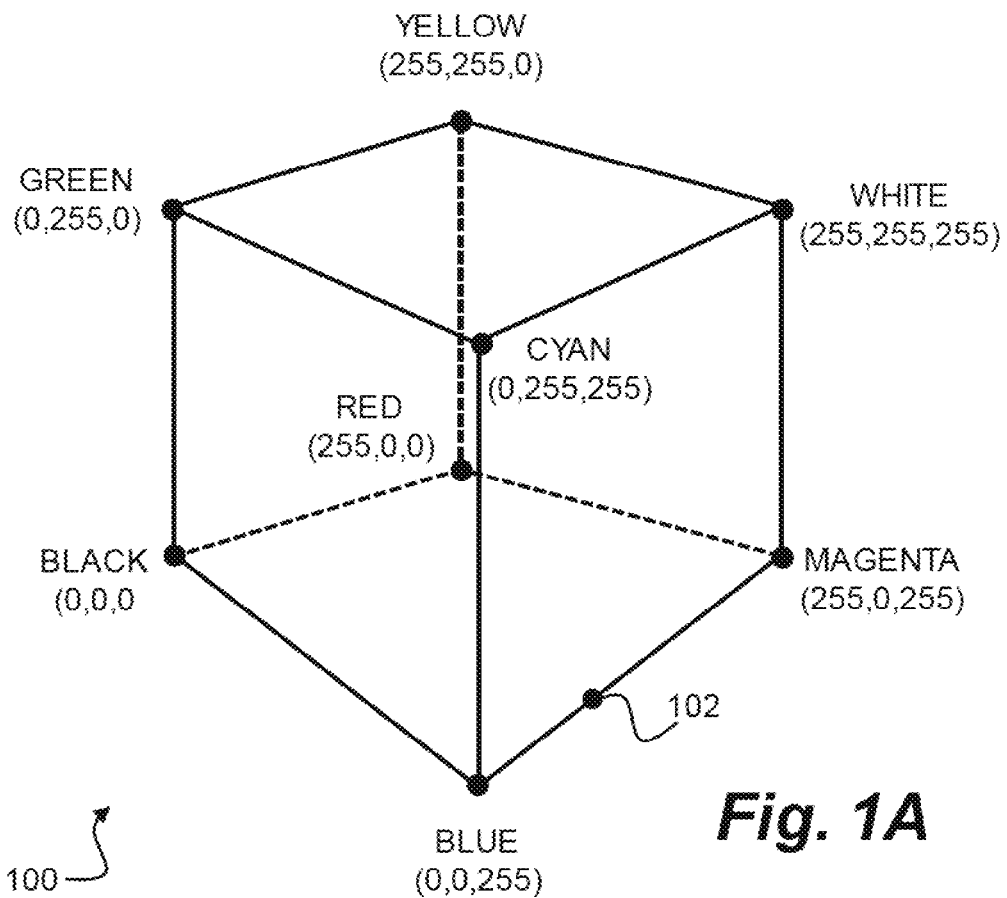
FIG. 1A is a schematic diagram showing a first color space in accordance with an example.
FIG. 1B is a schematic diagram showing an NP area coverage (NPac) vector in accordance with an example.

A printing system may utilize a halftoning process to reproduce a continuous tone image in the colorant color space using a series of shapes (e.g. dots). This enables the printing system to approximate a continuous tone image by using a discrete number of colorant levels (e.g. a discrete number of ink drops). The result of this process is an output in the form of a color separated halftone comprising a halftone plane corresponding to each colorant available to the printing system. The output of any particular printing system is dependent on the characteristics of the particular color halftone processing pipeline that is used by the printing system.

The colorant content of a print resolution pixel (hereinafter termed "pixel") may be defined in terms of a Neugebauer Primary (NP) vector, which specifies a combination of colorants to be deposited at a pixel location in a deposition process to produce the desired color for the pixel. Each element of an NP vector may specify a quantity of a respective colorant for the associated pixel in the colorant space. For example, an NP vector of [2 1 0 0] defined in a CMYK colorant space specifies a pixel comprising two units (e.g. two drops) of cyan colorant and one unit (e.g. one drop) of magenta colorant.

According to some print processes, the halftone may be printed or formed on the print medium in a plurality of deposition or application stages. For example, the halftone may be printed using a plurality of static print bars, which print to a movable print medium in at least one print pass, or a plurality of passes of a static print medium, performed by a moveable head unit. Typically, the maximum colorant quantity that can be deposited at a pixel in a given print process is limited by the number of deposition stages for the given print process.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

Image data may comprise color data represented in a first color space (hereinafter termed an "image color space"), such as image-level pixel representations in a RGB (red, green, blue) color space. In a printing pipeline, a color separation process may be used to map from the image color space to a second color space (hereinafter termed an "intermediate color space") for use in a halftoning process.

In some examples, the intermediate color space may be an area coverage space, such as the Neugebauer Primary area coverage (NPac) color space. An NPac vector in the NPac color space represents a statistical distribution of one or more Neugebauer Primary (NP) vectors over an area of a halftone. In other words, each NPac vector defines the probability distribution for one or more colorant combinations for each pixel in the halftone (e.g. a likelihood that a particular colorant combination is to be placed at each pixel location in the halftone). In this manner, a given NPac vector defines a set of halftone parameters that are used in the halftoning process to map a color defined in the image color space to one or more NP vectors to be statistically distributed over the plurality of pixels for a halftone. Moreover, the statistical distribution of NPs to pixels in the halftone serves to control the colorimetry and other print characteristics of the halftone.

Spatial distribution of the NPs according to the probability distribution specified in the NPac vector may be performed using any suitable halftoning methods as is known in the art. In this respect, examples of suitable halftoning methods include matrix-selector-based PARAWACS (Parallel Random Area Weighted Area Coverage Selection) techniques and techniques based on error diffusion. An example of a printing system that uses area coverage representations for halftone generation is a Halftone Area Neugebauer Separation (HANS) pipeline.

In some examples, the color separation process may utilize a data structure which stores a pre-computed mapping from a color defined in the image color space to a set of parameters defined in the intermediate color space. For example, the pre-determined mappings may be stored in a look-up table which is referenced by the color separation process to map from the image color space to the intermediate color space. In this respect, determination of the pre-computed mappings may be a complex and time consuming process due to the dimensionality of the intermediate color space. For example, where the intermediate color space is an NPac color space, the corresponding dimensionality is defined by the total number of NP states that are available for a given printing system, which in some cases may be in the order of 100,000 states or more. Accordingly, manual pre-calculation of mappings for population of the data structure for such printing systems is often impractical and pre-calculation of mappings based on simulations of the printing system may require sophisticated computational models which are often prohibitively complex.

Accordingly, certain examples described herein provide techniques for generation of a data structure providing mappings from the image color space to the intermediate color space. In particular, certain examples described herein provide techniques for generating data associating a color defined in the image color space with a set of halftone parameters defined in the intermediate color space, for use in a color separation process.

Certain examples described herein utilize an interpolation process in the intermediate color space to determine the set of halftone parameters corresponding to the particular color designated in the image color space. In some examples, the set of halftone parameters represents a relative area coverage of a colorant combination corresponding to the particular color designated in the image color space.

FIG. 1 is a schematic diagram showing a first color space 100 (hereinafter termed an "image color space") in accordance with an example. In this example, the image color space 100 is an RGB color space which is represented as a cube in a three dimensional space. In other examples, the image color space may be a CMYK color space, which is represented as a hypercube in four dimensional space. The vertices of the cube correspond to the primary colors (red, green, blue) and secondary colors (cyan, magenta, yellow) for the RGB color space, in addition to white and black.

In this example, the RGB color space is defined as a 24-bit color space. Thus, each color in the RGB color space is defined by a vector (X, Y, Z) where each of X, Y and Z take an 8-bit integer value in the range 0 to 255. Accordingly, black is defined as (0, 0, 0), white is defined as (255, 255, 255), red is defined as (255, 0, 0), green is defined as (0, 255, 0), blue is defined as (0, 0, 255), yellow is defined as (255, 255, 0), magenta is defined as (255, 0, 255) and cyan is defined as (0, 255, 255).

An initial set of NPac vectors are assigned to colors (i.e. locations) defined in the RGB color space 100. For example, the initial set of NPac vectors may be assigned to the vertices of the RGB color space 100. This assignment may be performed manually, based one or more empirical measures of printing quality, such as colorimetry, grain and/or coalescence. Once the initial set of NPac vectors have been assigned to locations in the RGB color space 100, an interpolation process is performed to determine a further mapping for a particular color defined in the image color space by preforming a spatial interpolation in the NPac color space from two or more NPac vectors in the initial set of NPac vectors to a location corresponding to the particular color. For example, an NPac vector corresponding to a color defined in the image color space at a location 102 may be determined by a spatial interpolation between the NPac vectors defined for the blue and magenta vertices to the location 102. This process may be repeated for a plurality of different locations in the image color space, to thereby populate a data structure for use in the color separation process.

FIG. 1B is an example of an NPac vector 110 resulting from the interpolation process discussed above. In this example, the NPac vector 110 defines a spatial distribution of NPs for a halftone corresponding to a CMYK colorant space, wherein 25 percent of the pixels are assigned a CCM (i.e. two cyan and one magenta) NP (defined by first element 112-1), 25 percent of the pixels are assigned a CC (i.e. two cyan) NP (defined by second element 112-2), and 50 percent of the pixels are assigned the CY (i.e. one cyan and one yellow) NP (defined by third element 112-3). In this manner, the NPac vector 110 specifies a set of halftone parameters which control generation of a halftone.

Figure 2:
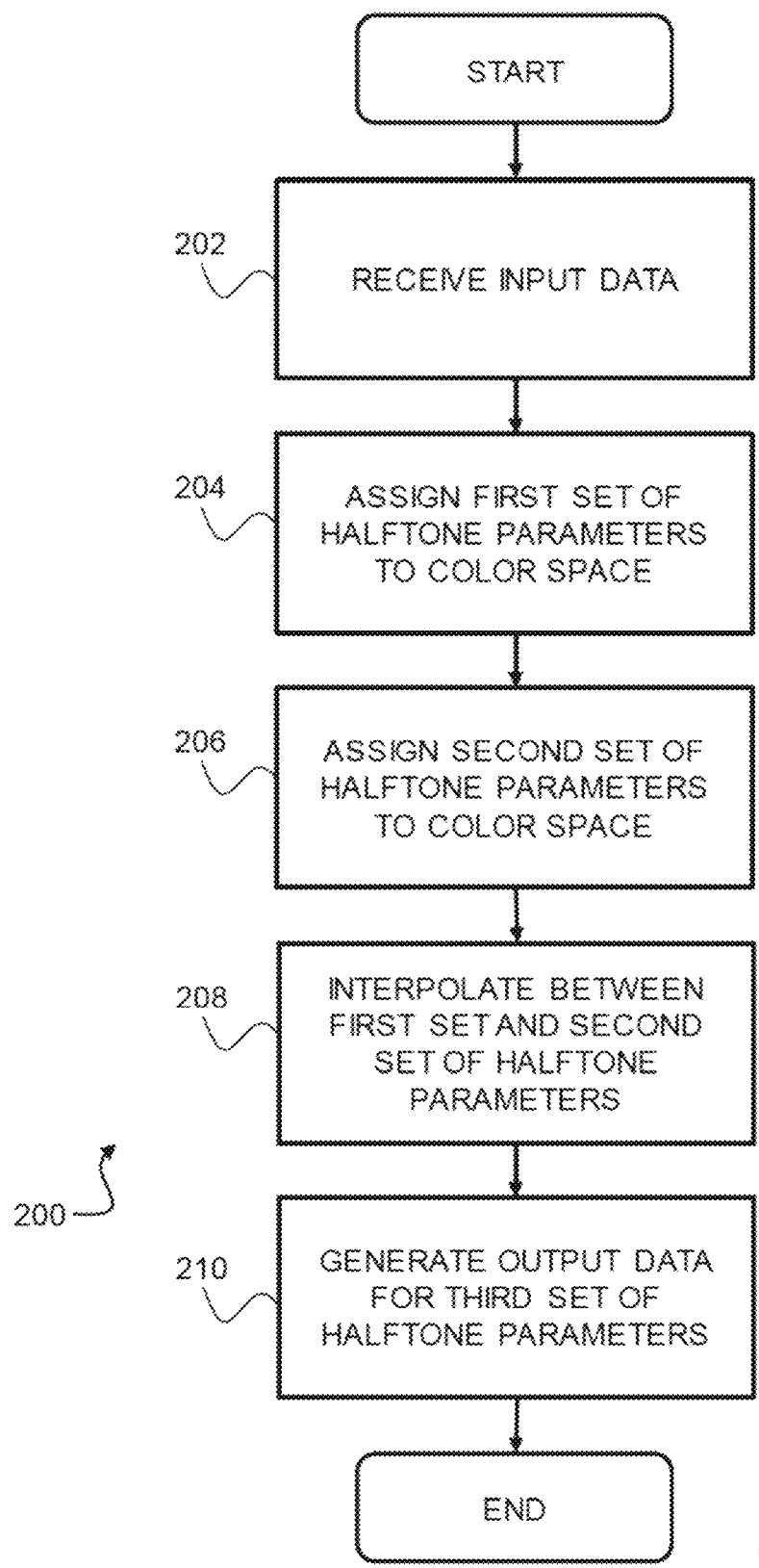
FIG. 2 is a flow diagram showing a method of generating a set of halftone parameters in accordance with an example.

FIG. 2 is a flow diagram showing an example of a method 200 of generating a set of halftone parameters for a halftone. At block 202, input data specifying a first set of halftone parameters for a first color in an image color space and a second set of halftone parameters for a second color in the image color space is received. At block 204 the first set of halftone parameters is assigned to a first location in the image color space corresponding to the first color, and at block 206 the second set of halftone parameters is assigned to a second location in the image color space corresponding to the second color. As discussed above, the correspondence between a given set of halftone parameters and a location in the image color space may be determined manually based on one or more empirical measures of printing quality, such as colorimetry, grain and/or coalescence. At block 208, an interpolation between the first set halftone parameters and the second set of halftone parameters is performed, based on the first location and the second location, to determine a third set of halftone parameters corresponding to a third location in the image color space. This interpolation process results in a mapping between a third color corresponding to the third location in the image color space and the third set of halftone parameters determined in the interpolation process. At block 210, output data associated the third set of halftone parameters with the third color is generated for subsequent use in a color separation process in a printing pipeline.

In some examples, first and second colors received in the input data in block 202 may be defined in the RGB image color space 100 of FIG. 1A. Similarly, the first and second sets of halftone parameters received in the input data in block 202 may be defined in the NPac intermediate color space, as discussed above with reference to FIGS. 1A and 1B.

The method 200 described above with reference with FIG. 2 may be repeated to determine mappings between a plurality of colors defined in the image space and corresponding sets of halftone parameters in the intermediate color space. In this manner, a data structure for use in a color separation process, such as a look-up table, may be populated in a relatively straightforward manner.

The assignment of the first and second sets of halftone parameters to locations in the image color space at blocks 204 and 206 of FIG. 2 serve as initial color mappings for "seeding" the interpolation process. For example, the first and second sets of halftone parameters may correspond to colors defined by the vertices of the image color space. In further examples, additional initial color mappings may be defined to provide additional data points for the interpolation process, thereby ensuing smooth interpolation within the intermediate color space. The additional initial color mappings may correspond to locations on one or more edges in the image color space, one or more diagonals in the image color space, one or more internal locations in the image color space, or any combination thereof.

Figure 3:
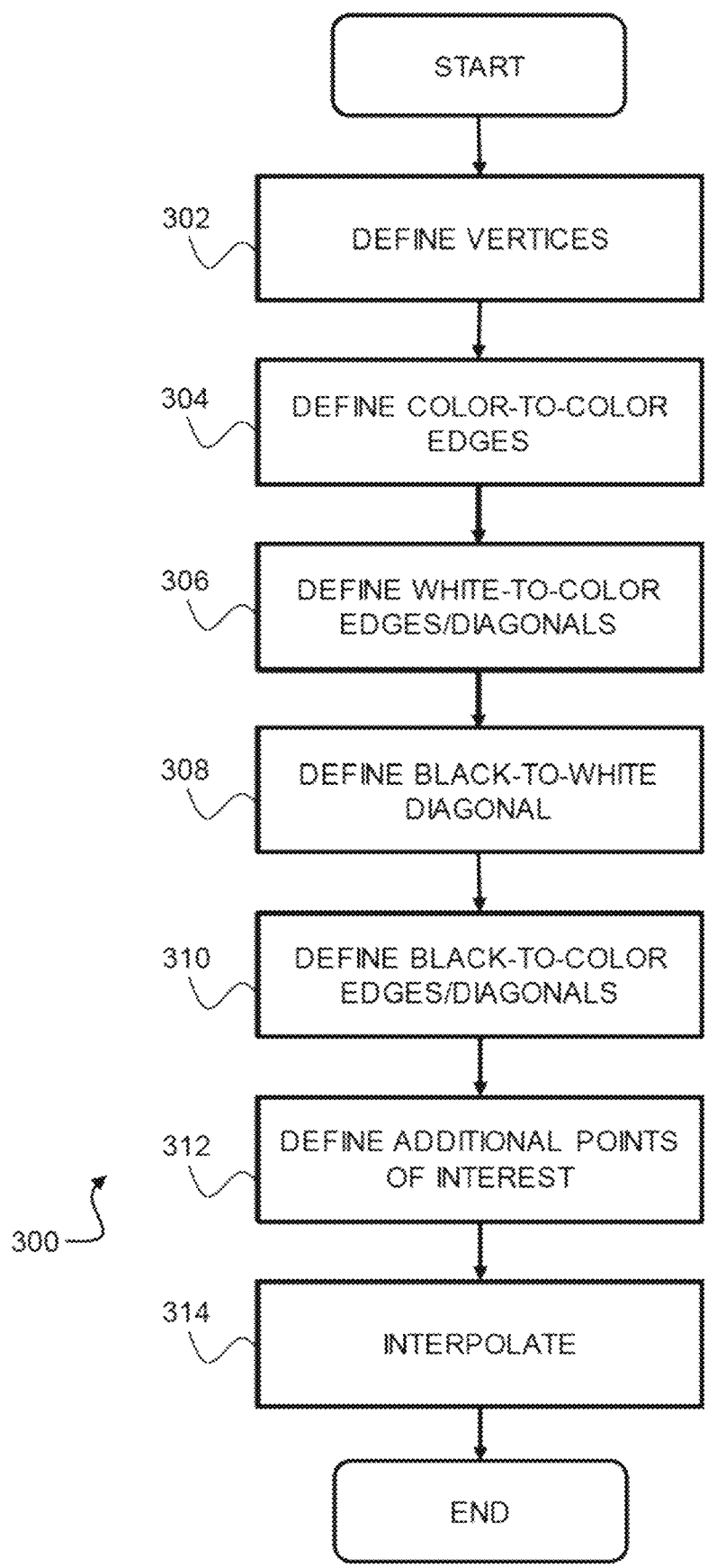
FIG. 3 is a flow diagram showing a method of generating a set of halftone parameters in accordance with an example.

FIG. 3 is a flow diagram showing an example of a method for defining a plurality initial mappings for seeding the interpolation process. In block 302, one or more initial mappings are defined for one or more vertices of the image color space. In block 304, one or more initial mappings are defined for locations on one or more color-to-color edges in the image color space. In block 306, one or more initial mappings are defined for locations on one or more white-to-color edges and diagonals in the image color space. At block 308, one or more initial mappings are defined for locations on the black-to-white diagonal in the image color space. At block 310, one or more initial mappings are defined for location on the one or more black-to-color edges and diagonals in the image color space. At block 312, one or more initial mappings are defined for any additional locations of interest in the image color space. Once al initial mappings have been defined, an interpolation process is performed at block 314, based on the initial mappings defined in blocks 302 to 312, to determine mappings for other locations in the image color space, and thereby populate the data structure for use in the color separation process. In some examples, one or more of blocks 302, 304, 306, 308, 310 and 312 may be omitted or the order of the blocks may be varied. Indeed, according to some examples, only a set of initial mappings corresponding to the vertices of the image color space may be defined at block 302 for interpolation at block 314.

According to certain examples, the interpolation process in block 302 may be implemented using a technique that supports an irregular distribution of the initial mappings. For example, a Delaunay tessellation in two steps may be used. Moreover, to avoid the creation of an irregular 3D tessellation in the image color space, a 2D Delaunay interpolation may be performed in the three planes delimited by black, white, and two complementary vertices, namely: black-white-red-cyan, black-white-blue-yellow, and black-white-green-magenta. This approach provides a finer sampling inside the image color space, thereby ensuring that a 3D tessellation is possible without generation of artifacts.

According to certain examples, the interpolation process in block 302 may be performed in a domain corresponding to the intermediate color space (e.g. the NPac color space). Moreover, the interpolation may be performed in a linearized domain that is gamma-corrected to account for particular perceptual non-uniformities along each axis of the domain. The interpolation may utilize a linear interpolation technique or a higher order technique where a sufficient number of initial mappings are available.

Figure 4:
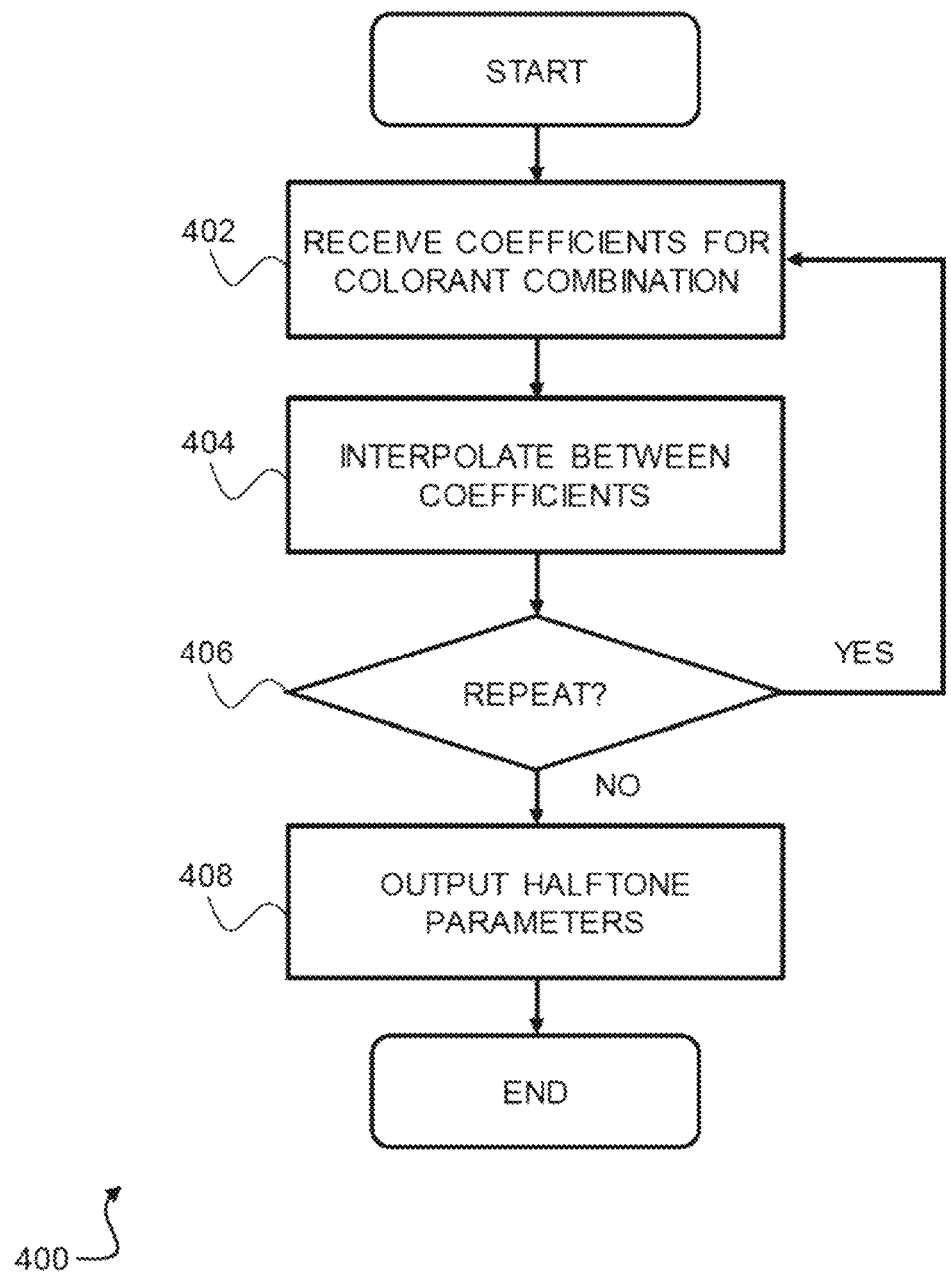
FIG. 4 is a flow diagram showing a method of interpolating between a first set of halftone parameters and a second set of halftone parameters in accordance with an example.

FIG. 4 is a flow chart showing a method 400 of interpolating between a first set of halftone parameters and a second set of halftone parameters in accordance with an example. In this example, the first set of halftone parameters comprises a first area coverage coefficient associated with a particular combination of colorants and the second set of halftone parameters comprises a second area coverage coefficient associated with the particular combination of colorants. In some examples, the first and second area coverage coefficients correspond to the elements of NPac vectors associated with a particular combination of colorants (i.e. a particular NP vector). According to this method 400, the first and second coefficients for the particular colorant combination are received as initial mappings at block 402. At block 404, an interpolation between the first and second coefficients in the image color space is performed to determine a coefficient corresponding to a third location in the image color space. At this point, the method determines whether the first and second sets of halftone parameters include further coefficients associated with any other colorant combinations at block 406. If further coefficients are present, the method 400 repeats blocks 402 and 404 for the further set of coefficients. In this manner, the method 400 interpolates between coefficients corresponding to every colorant combination associated with the first and/or second sets of halftone parameters. Once this process has been completed, the method 400 outputs the one or more interpolated coefficients in the form of a third set of halftone parameters (e.g. a third NPac vector) corresponding to the third location in the image color space, at block 408.

A characteristic of the method 400 shown in FIG. 4 is that the third set of halftone parameters resulting from the interpolation process is limited in structure to the colorant combinations associated with the first and second sets of halftone parameters. For examples where the halftone parameters are defined as NPac vectors, this means that the NPac vector corresponding to the third color may only include NPs that are included in the NPac vectors defined for one or both of the first and second colors. Thus, the method 400 provides limited control over the structure of the colorant combinations resulting from the interpolation process.

In some examples, interpolation between the first and second sets of halftone parameters may be performed in a colorant quantity domain, rather than the colorant combination domain. According to such methods, the first and second sets of halftone parameters are converted to colorant quantities, on the basis of which an interpolation process is performed. The result of this process is an interpolated ink quantity corresponding to the third color, and the interpolated ink quantity must be converted back into a set of halftone parameters, such as an NPac vector.

Figure 5:
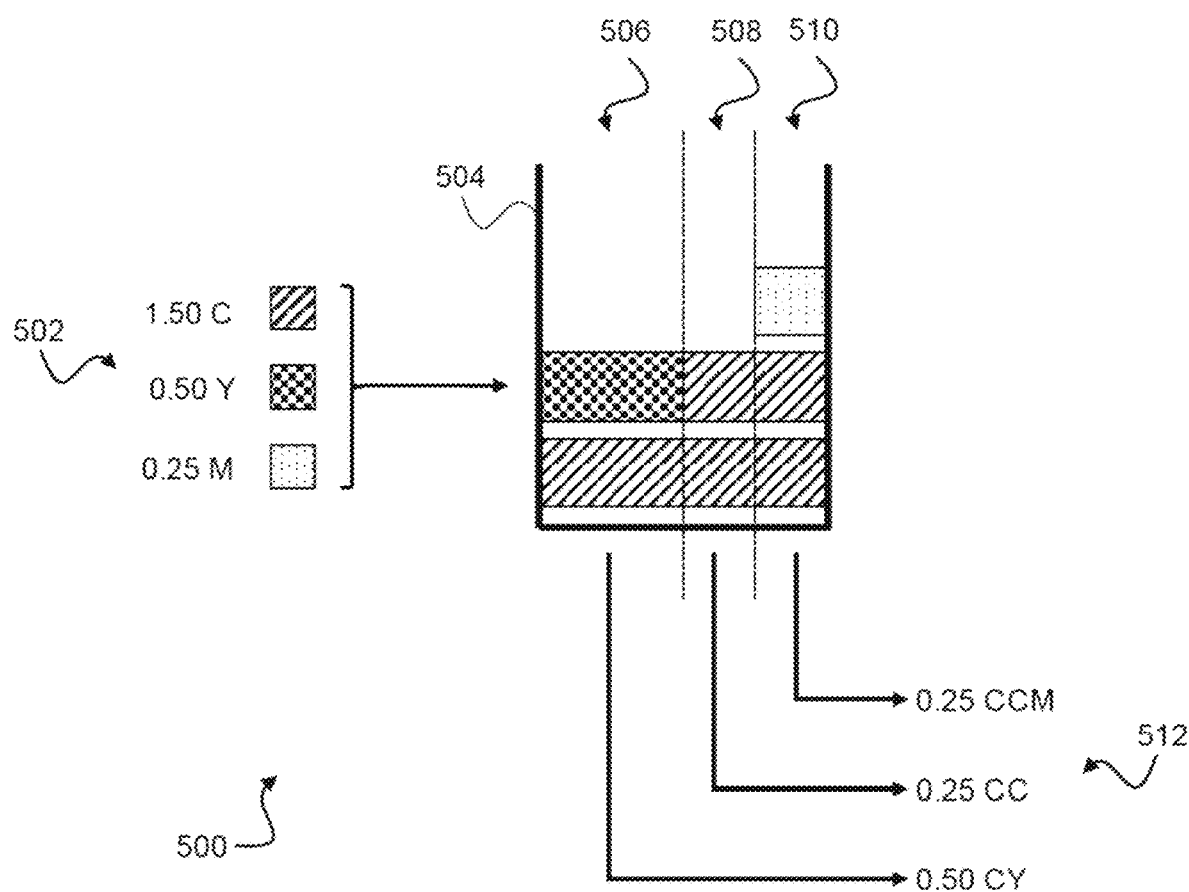
FIG. 5 is a schematic diagram showing a technique for converting a colorant quantity to an NPac vector in accordance with an example.

FIG. 5 is a schematic diagram showing a technique 500 for converting a set of interpolated colorant quantities 502 into a set of halftone parameters 512. Specifically, FIG. 5 shows conversion of the set of interpolated colorant quantities 502 into an NPac vector. In this example, the interpolated ink quantities are 1.5 C, 0.5 Y, 025 M, which correspond to the average colorant quantities per-pixel for a halftone. The interpolated colorant quantities are "layered" into a theoretical print cell 504 corresponding to a pixel in the halftone. In some examples, the interpolated colorant quantities are layered into the theoretical print cell in a predefined colorant order (e.g. C, M, Y, K), as shown in FIG. 5. The result of this operation is a plurality of colorant layers in the theoretical print cell that can be divided into discrete "stacks" 506, 508 and 510. For example, the discrete stacks may be determined based on the boundaries that arise within each layer when the ink quantities are placed in the theoretical print cell (e.g. the boundary between stack 506 and stack 508 is created in the middle layer, and the boundary between stack 508 and stack 510 is created in the top layer). Each stack represents a particular colorant combination (i.e. NP vector) and the relative width of each stack indicates the relative area coverage for the respective colorant combination the corresponding halftone. In the present example the first stack 506 corresponds to a CY colorant combination with 50 percent area coverage; the second stack 508 corresponds to a CC colorant combination with 25 percent area coverage; and the third stack 510 corresponds to a CCM colorant combination with 25 percent area coverage. Thus, the result of this layering process is an NPac vector 512 with value [0.5 CY, 0.25 CC, 0.25 CCM] as shown in FIG. 5. In other words, the interpolated ink quantities are converted into an NPac vector which specifies that 50 percent of the pixels in the halftone should comprise CY colorants, 25 percent of the pixels in the halftone should comprise CC colorants and 25 percent of the pixels in the halftone should comprise CCM colorants. Thus, the technique 500 provides a relatively smooth distribution of colorants in the halftone (i.e. no pixels include large colorant combinations placed adjacent to white pixels), thereby ensuring improved grain in the printed halftone.

In some examples, the layering of colorants in the theoretical print cell can be controlled to ensure particular properties for the resulting NPac vector. For example, the layering of colorants may be controlled to ensure that different colorants are assigned to different stacks in the theoretical print cell. An example of such ordering may be used to ensure that a stack comprising a black colorant should, as far as possible, only comprise black colorant, to avoid halftone pixels which combine black and other (i.e. non-black) colorants.

Figure 6:
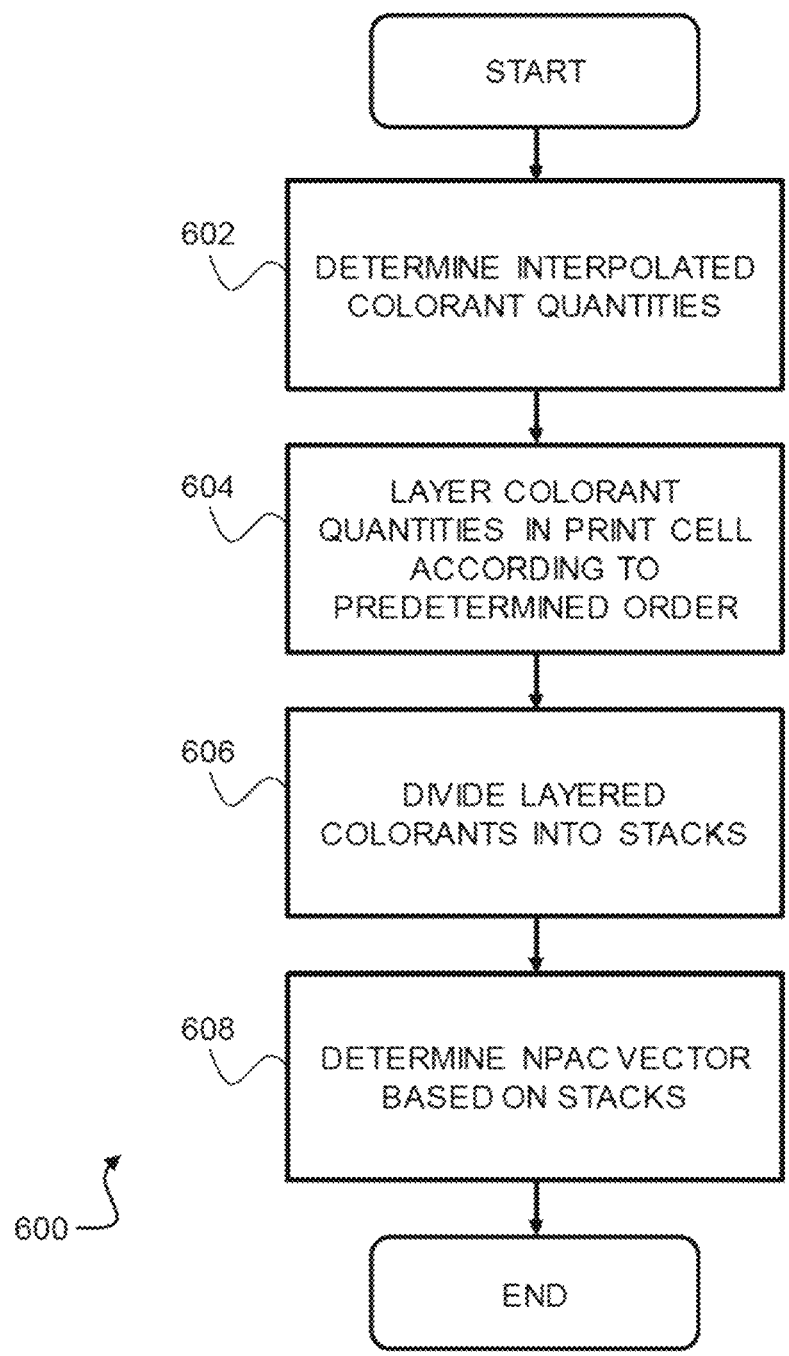
FIG. 6 is a flow diagram showing a method of converting a colorant quantity to an NPac vector in accordance with an example.

FIG. 6 is a flow diagram showing a method 600 of converting a colorant quantity to an NPac vector in accordance with an example. In particular, the method 600 corresponds to the technique 500 discussed above with reference to FIG. 5. In block 602 a set of interpolated colorant quantities is obtained using, for example, the colorant quantity interpolation process described above. Next, interpolated colorant quantities are layered into the theoretical print cell in accordance with a predetermined order at block 604. The layers resulting from block 604 are divided into one or more colorant stacks comprising respective colorant combinations at block 606. At block 608 each stack is converted into an area coverage coefficient based on its relative width in the theoretical print cell, and used to form the NPac vector corresponding to the interpolated colorant quantities.

In some examples, it is desirable to ensure that the interpolation process performed for locations on the color-to-black diagonal produces sets of halftone parameters that match the halftone parameters interpolated for the white-to-black diagonal (hereinafter termed the "gray ramp") in the image color space 100, in terms of properties and structure. Moreover, it is desirable that the halftone parameters generated for the color-to-black diagonal result in the maximum colorant deposition for the printer system, to avoid any loss of chromaticity for dark colors. These requirements may necessitate additional consideration in the interpolation process, as discussed below with reference to FIGS. 7 and 8.

Figure 7:
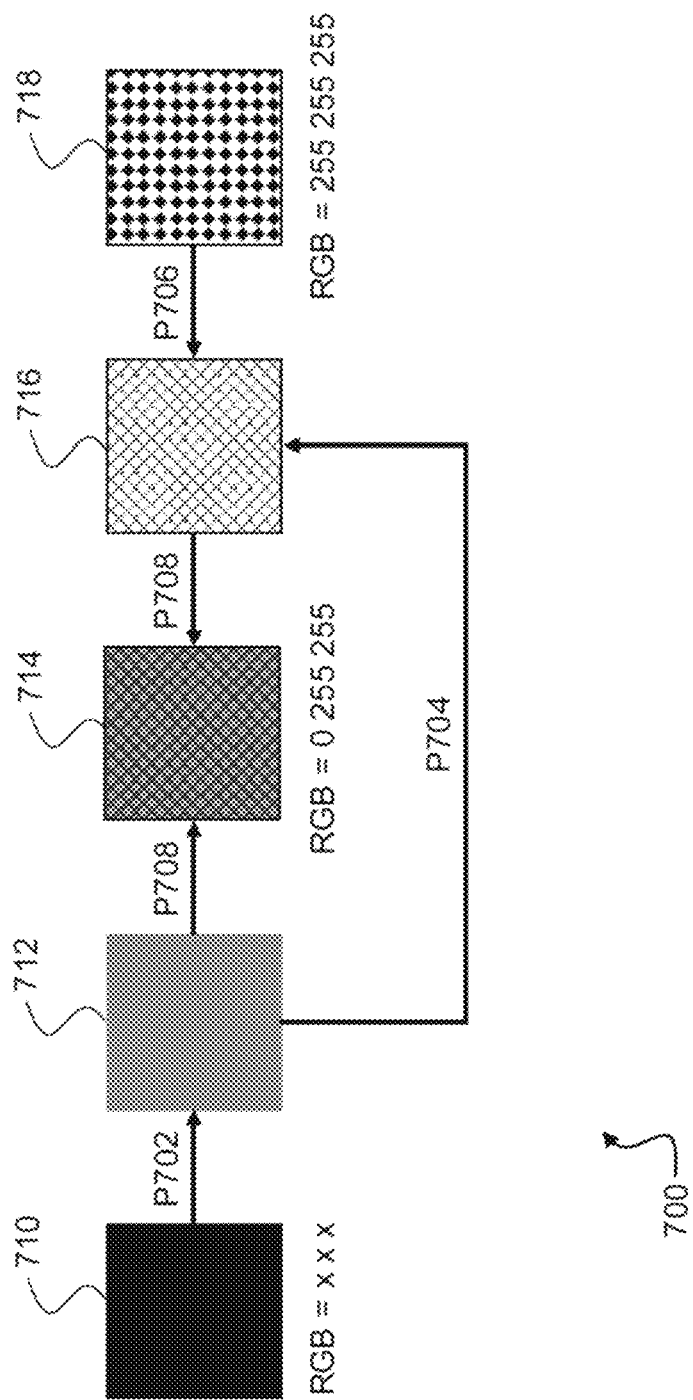
FIG. 7 is a schematic diagram showing a technique for generating an NPac vector in accordance with an example.

FIG. 7 is a schematic diagram showing a technique 700 for generating an NPac vector in accordance with an example. In particular, FIG. 7 shows an interpolation technique for colors located on a color-to-black diagonal, which accounts for the additional considerations discussed above. In this diagram, the NPac vectors are represented schematically, with the gray ramp NPac vectors being represented using solid grayscale colors and the color NPac vectors being represented using cross hatching. According to technique 700, the corresponding NPac vector 710 in the gray ramp is first obtained and depleted by a predetermined percentage to produce a depleted gray NPac vector 712 (process P702). The depletion process may comprise applying a scaling to the NP coefficients in the gray ramp NPac vector 710, thereby ensuing that the NP structure is preserved in the depleted gray NPac vector 712. Next, a colorant amount that can be added to the depleted gray NPac vector 712 to reach the colorant limit is calculated (process P704) by, for example, converting the depleted gray NPac vector 712 into a set of colorant quantities for comparison with a colorant limit associated with a particular printing system. Next, a color NPac vector 718 defined for a color on the black-color diagonal is depleted by an amount matching the colorant amount calculated in process 704 to produce a depleted color NPac vector 716 (process P706). Finally, the depleted gray NPac vector 712 and the depleted color NPac vector 716 are combined (i.e. summed) to produce an NPac vector that preserves the structures of the gray ramp NPac vector 710 and the color NPac vector 718, whilst maximizing the colorant quantity.

Figure 8:
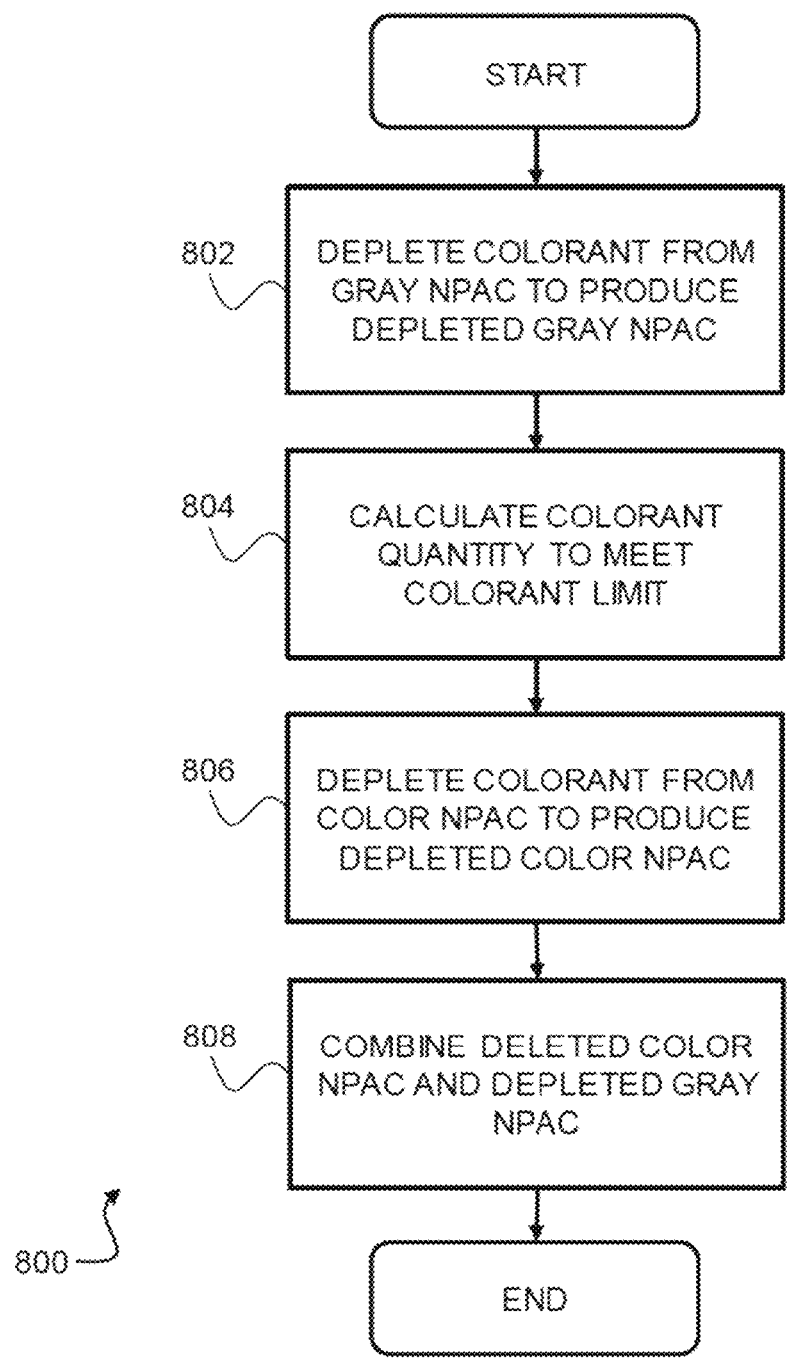
FIG. 8 is a schematic diagram showing a method of generating an NPac vector in accordance with an example.

FIG. 8 is a flow diagram showing a method of generating an NPac vector on a black-color diagonal in the image color space, in accordance with an example. In a particular, method 800 corresponds to the technique discussed above with reference to FIG. 7. In block 802, the NPac vector 710 for a corresponding location in the gray ramp is obtained and depleted by a predetermined percentage to produce the depleted gray NPac vector 712. At block 804, the colorant amount that can be added to the depleted gray NPac vector 712 to reach the colorant limit is calculated. At block 806, the color NPac vector 718 defined for a location on the black-color diagonal is depleted by an amount matching the colorant amount calculated in block 804, to produce the depleted color NPac vector 716. At block 808, the depleted gray NPac vector 712 and the depleted color NPac vector 716 are combined to produce an NPac that preserves the NPac structures of the gray ramp NPac 710 and the color NPac 718, whilst maximizing the colorant quantity.

Figure 9:
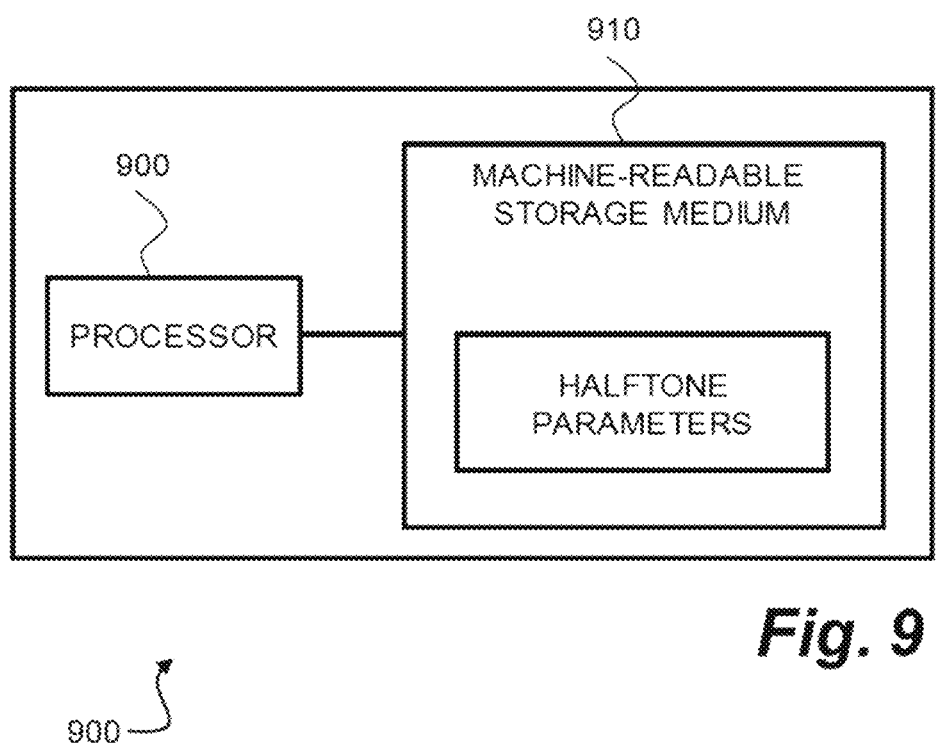
FIG. 9 is a schematic diagram showing a printing system in accordance with an example.

Certain methods and systems as described herein may be implemented by a processor that processes computer program code that is retrieved from a non-transitory storage medium. FIG. 9 shows an example of a computing system 900 comprising a machine-readable storage medium 910 coupled to a processor 920. Machine-readable media 910 can be any non-transitory media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 9, the machine-readable storage medium comprises program code to implement generation of halftone parameters using the techniques and methods described above with reference to FIG. 1 to 8.

According to some examples, the second color space may be defined as material volume coverage space for use in an additive manufacturing apparatus. In such examples, the vector components of a material volume coverage vector (MVoc) represent al materials available to the additive manufacturing apparatus and their combinations. In other words, the MVoc vectors are an enumeration of possible build or deposit states available to the additive manufacturing apparatus. The vector components of the MVoc may be considered analogous to the concept of Neugebauer Primaries as discussed above. In this analogy, each vector component may be considered to comprise a volume coverage of a "material primary". As such the material volume coverage vector has a dimensionality representative of these states and contains the volume coverages (e.g. probabilities) associated with each state. Or in other words, the MVoc comprises weighted combinations or probabilities of material primaries. Thus, according to some example, the techniques and methods described above with reference to FIGS. 1 to 9 may be applied to interpolate between parameters defined in an MVoc space to build a mapping for use in the additive manufacturing process.

The preceding description has been presented to illustrate and describe examples of the principles described. This description is not intended to be exhaustive or to limit these principles to any precise form disclosed. Many modifications and variations are possible in light of the above teaching. Although the flow diagrams shows a specific order of execution, the order of execution may differ from that which is depicted.

What is claimed is:

1. A method comprising:
   assigning, by a processor, a first set of halftone parameters to a first location in a color space, the first location in the color space corresponding to a first color;
   assigning, by a processor, a second set of halftone parameters to a second location in the color space, the second location in the color space corresponding to a second color;
   interpolating, by a processor, between the first set of halftone parameters and the second set of halftone parameters, based on the first location and the second location, to determine a third set of halftone parameters corresponding to a third location in the color space; and
   generating, by a processor, output data associating the third set of halftone parameters with a third color, the third color corresponding to the third location in the color space;
   wherein the first set of halftone parameters represents a relative area coverage of a first colorant combination and the second set of halftone parameters represents a relative area coverage of a second colorant combination.

2. The method of claim 1, wherein the color space corresponds to an image color space.

3. The method of claim 1, wherein:
   the first set of halftone parameters comprising a first area coverage coefficient associated with a combination of colorants;
   the second set of halftone parameters comprises a second area coverage coefficient associated with the combination of colorants; and
   the third set of halftone parameters comprises a third area coverage coefficient associated with the combination of colorants.

4. The method of claim 3, wherein interpolating between the first set of halftone parameters and the second set of halftone parameters comprises:
   interpolating between the first area coverage coefficient and the second area coverage coefficient to determine the third area coverage coefficient, based on the first location, the second location and the third location.

5. The method of claim 1, wherein:
   the first set of halftone parameters comprising a first area coverage coefficient associated with a first combination of colorants;
   the second set of halftone parameters comprises a second area coverage coefficient associated with a second combination of colorants; and
   the third set of halftone parameters comprises a third area coverage coefficient associated with a third combination of colorants.

6. The method of claim 5, wherein interpolating between the first set of halftone parameters and the second set of halftone parameters comprises:
   converting the first set of halftone parameters to a first set of colorant quantities based on the first area coverage coefficient and the first combination of colorants;
   converting the second set of halftone parameters to a second set of colorant quantities based on the second area coverage coefficient and the second combination of colorants; and
   interpolating between the first set of colorant quantities and the second set of colorant quantities to determine a third set of colorant quantities based on the first location, the second location and the third location.

7. The method of claim 6, comprising:
   determining the third area coverage coefficient and the third combination of colorants based on the third set of colorant quantities.

8. The method of claim 1, wherein the first location corresponds to a first vertex in the color space and the second location corresponds to a second vertex in the color space.

9. The method of claim 1, wherein the first location and the second location are located on an edge of the color space.

10. The method of claim 1, wherein the first location corresponds to a gray color in the color space and the second location corresponds to a vertex of the color space, wherein interpolating between the first set of halftone parameters and the second set of halftone parameters comprises:
    reducing the relative area coverage of the first colorant combination to produce a reduced relative area coverage of the first colorant combination;
    reducing the relative area coverage of the second colorant combination to produce a reduced relative area coverage of the second colorant combination; and
    combining the reduced relative area coverage of the first colorant combination and the reduced relative area coverage of the second colorant combination to produce the third set of halftone parameters.

11. The method of claim 10, wherein, in combination, the reduced relative area coverage of the first colorant combination and the reduced relative area coverage of the second colorant combination correspond to a colorant limit which specifies the maximum quantity of colorant that can be deposited at a pixel in the halftone.

12. The method of claim 1, wherein interpolating between the first set of halftone parameters and the second set of halftone parameters is performed based on a Delaunay tessellation.

13. The method of claim 1, wherein the output data comprises a look-up table associating the third set of halftone parameters with the third color corresponding to the third location in the color space.

14. The method of claim 1, comprising: using the output data in a color separation process of a printing pipeline.

15. The method of claim 1, further comprising:
    performing, by a printing system, a color separation process for an image using the generated output data, to generate a color-separated image.

16. The method of claim 15, further comprising:
    printing the color-separated image using the printing system.

17. A non-transitory computer-readable storage medium comprising computer-executable instructions which, when executed by a processor, cause a computing device to:
    assign a first color space vector to a first location in an image color space, the first location in the image color space corresponding to a first color;
    assign a second color space vector to a second location in the image color space, the second location in the image color space corresponding to a second color;
    interpolate between the first color space vector and the second color space vector, based on the first location and the second location, to determine a third color space vector corresponding to a third location in the image color space;

generate output data associating the third color space vector with a third color, the third color corresponding to the third location in the image color space;

wherein the first color space vector defines a first probability distribution for one or more colorant combinations and the second color space vector defines a second probability distribution for the one or more colorant combinations.

18. A computing device comprising:

a processor, and a memory storing computer-executable instructions which, when executed by the processor, cause the computing device to:

interpolate between a first set of parameters and a second set of parameters, based on a first location in a color space and a second location in the color space, to determine a third set of parameters corresponding to a third location in the color space, wherein the first location in the color space corresponds to a first color, the second location in the color space corresponds to a second color and the third location in the color space corresponds to a third color; and generate output data associating the third set of parameters with the third color;

wherein the first set of parameters represents a first probability distribution for one or more material combinations and the second set of parameters represents a second probability distribution for the one or more material combinations.

* * * * *